United States Patent Office 3,702,778
Patented Nov. 14, 1972

3,702,778
SHIP'S HULL COATED WITH ANTIFOULING SILICONE RUBBER
William J. Mueller, Worthington, and Louis J. Nowacki, Columbus, Ohio, assignors to Batelle Memorial Institute, Columbus, Ohio
No Drawing. Filed Mar. 23, 1970, Ser. No. 22,060
Int. Cl. B32b 15/08, 25/20
U.S. Cl. 117—75                                          6 Claims

ABSTRACT OF THE DISCLOSURE

Surfaces of articles, whose utility involves exposure of the surface to an aqueous marine-fouling environment, are protected from marine fouling thereof by a cured silicone rubber overlying and excluding the aqueous marine-fouling environment from contacting the surface.

---

This invention relates to prevention of marine fouling of surfaces which, when unprotected, are subject to marine fouling upon exposure to aqueous marine-fouling environments. More particularly, the invention concerns improvement of an article, whose utility involves exposure of a surface thereof to an aqueous marine-fouling environment, through a cured silicone rubber overlying and excluding the aqueous marine-fouling environment from contacting the surface, whereby not only marine fouling of the surface is avoided but also whatever marine fouling of the overlying cured silicone rubber as may occur is at a significantly low level in comparison to marine fouling of the surface were it to be unprotected.

"Fouling" is commonly defined as assemblages of marine animals and planets which grow on artificial structures. These are the same marine organisms that grow on rocks, stones, and other natural objects. Marine fouling results from the growth of marine animals and plants on the surfaces of man-made objects in contact with aqueous-marine-fouling environments, such as ocean water. It is most widely encountered on bottoms and hulls of ships, flying boat underbodies, pier supports, buoys, water-intake pipes, and the like. These articles generally employ construction materials, such as various metals including iron, steel, copper, aluminum, and like metals, wood, polyester-fiber glass laminates, and the like, for surfaces thereof contacting aqueous marine environments and almost invariably effort is made to protect these exposed surfaces through various fouling preventing means being used therewith. As illustrative thereof, antifouling paints and coatings of numerous types today are applied to ship bottoms of vessels plying the oceans, with the advantages and benefits of antifouling paints well known and recognized.

Reference is made to a monograph entitled "Marine Fouling and Its Prevention" prepared for Bureau of Ships, Navy Department, by Woods Hole Oceanographic Institution, printed by George Banta Publishing Company, Menasha, Wis., 1952, 388 pages, to supplement teachings of the art of concern to which the present invention is directed. As will be apparent from that monograph and teachings therein, marine fouling has been a long recognized problem with much effort expended toward its prevention. In early times effort was toward finding a material per se or a coating or sheathing material which would be relatively resistant to fouling. Along this approach, U.S. Pat. No. 90,022, Read, teaches sheathing of hulls of vessels with vulcanizable and vulcanized gutta-percha and India rubber. In more recent times the most widely used fouling prevention means has been an applying of paints and coatings or the like which contain a material or combination of materials toxic to various troublesome marine animals and plants causing marine fouling. Generally as the toxic material leaches from the paint or coating, it prevents attachment of marine plants and animals. However, paints and coatings containing toxics are not without disadvantages and detriments. For example, their useful life is no greater than that provided by their toxic content and as the toxic content thereof dissipates so also is their antifouling protection lost. Likewise, the application of various paints and coatings containing such toxic materials generally is not feasible without some precautions being taken to safeguard the human appliers of the paint or coating. Accordingly it is to overcome such disadvantages and detriments in the art that the present invention is directed.

It now has been discovered that cured silicone rubber is of significant value in the prevention of marine fouling and further that cured silicone rubber overlying and excluding the aqueous marine-fouling environment from contacting an article's surface, subject to marine fouling when exposed to an aqueous marine-fouling environment, will not only avoid marine fouling of the surface but also will be less subject to marine fouling than the surface itself were it to be unprotected. Advantageously the cured silicone rubber is relatively nontoxic and is preparable and employed in a manner to greatly decrease and minimize various toxicity problems frequently encountered when applying a paint or coating containing a toxic material. Advantageously smooth cured silicone rubber overlying ship bottom surfaces in addition to preventing marine fouling also appears to permit increased vessel speed apparently by reducing frictional resistance of the vessel moving through the water.

The present invention lies in an article whose utility involves exposure of a surface thereof to an aqueous marine-fouling environment and which surface, when unprotected, is subject to marine fouling upon exposure to the aqueous marine-fouling environment, and is the improvement thereof a cured silicone rubber overlying and excluding the aqueous marine environment from contacting the surface. The invention also includes the process of preventing marine fouling of such a surface of such an article through providing that surface with overlying cured silicone rubber and then subsequently exposing the article to an aqueous marine-fouling environment.

In the invention there is employed a cured silicone rubber. Cured silicone rubber is known as well as the curable silicone gums which upon curing provide the cured silicone rubber. In general, a silicone gum is a highly linear high-molecular weight organosiloxane polymer consisting essentially of alternating atoms of silicon and oxygen as a polymeric backbone with organic groups attached to silicon atoms of its polymeric backbone. Silicone gum is differentiated from a silicone fluid in that the gum generally is more linear, contains less branching, and is of a higher molecular weight. A silicone fluid may include up to 5 to 10 percent branching, i.e., organosiloxy groups appended to silicon atoms of the polymeric backbone, and is of a weight-average molecular weight of less than 100,000. Silicone gum is differentiated from silicone resin in that silicone resins are highly cross-linked siloxane structures whose cross-linking component was introduced as a trifunctional or tetrafunctional silane in their preparation.

Cured silicone rubber can be prepared by heat curing with various catalysts, or by radiation curing, a silicone gum of the following structure

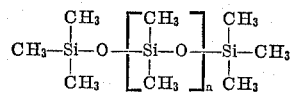

where $n$ is an integer of a magnitude providing a weight-average molecular weight in the hundreds of thousands and generally of about 500,000 and higher. Several structural variations of this heat-cured, also radiation-curable, gum also are known and are useful in the invention, wherein up to about 1 percent of the methyl substituents thereof are replaced by a vinyl group, up to about 20 percent of the methyl substituents are replaced by a phenyl group, or up to 35 percent of the methyl substitutents are replaced by halogenated-alkyl or -phenyl groups, e.g., $CF_3CH_2CH_2$— groups, and the like. In the art these types of gums frequently are referred to as: general purpose gum (contains methyl and vinyl); high- and low-temperature gum (contains methyl, phenyl and vinyl); low compression set gum (contains methyl and vinyl); and solvent resistant gum (contains fluorosilicone groups).

Cured silicone rubbers also are preparable from RTV gums (room temperature vulcanizable silicone gums). These RTV gums are polyorganosiloxy or silicone fluids containing silanol end groups, and often also containing other active sites of an ethoxy or methoxy radical or hydrogen atom linked to a silicon atom thereof. They are differentiated from the usual silicone fluid because of presence therein of active sites and silanol end groups. While the organic groups attached to the silicon atoms of its polymeric backbone largely are methyl groups, RTV gums also are known wherein small amounts of these methyl groups have been replaced by phenyl, trifluoropropyl, or cyanoethyl groups to improve low-temperature, heat-, radiation-, and solvent-resistant properties. There are commercially available both a one-package and a two-package system of the RTV gums.

To provide a cured silicone rubber as by heat curing, the silicone gum first is freshened and catalyzed, such as by freshly milling and adding a suitable catalyst system to the gum. It then is molded for a suitable time at a temperature and pressure requisite to introduce cross-links in an amount providing an elastomeric cured product. Frequently employed catalysts are: benzoyl peroxide, di-tertiarybutyl peroxide, and tert-butylperbenzoate, with some special cures utilizing bis(2-4-dichlorobenzoyl) peroxide, 2,5-dimethyl-2,5-di-(t-butyl peroxy) hexane, or t-butyl peroxy-benzoate dicumyl peroxide as the catalyst. The catalyst generally is employed in a relative amount of between 1 and 3 parts by weight thereof for each 100 parts by weight of the gum. Fillers, such as finely divided silica (e.g., fume silica), diatomaceous earth, mined silica, carbon black, titanium dioxide, calcium carbonate, ferric oxide, and the like may be included in the cured silicone rubber in amounts and for purposes well known in the art. When included, these fillers frequently are blended with the gum in a doughboy or Banbury mixer and then subsequently the peroxide catalyst added to the mixture on a water-cooled mill. Typical curing conditions are 5 to 20 minutes at 225° to 350° F. under 800 to 1500 p.s.i. Rather than heat curing such a peroxide-catalyzed silicone-gum, gamma or high-energy eelctron curing of the gum, with or without catalyst thereon, is possible. Generally 3–5 million roentgens provide adequate cure with gamma radiation employed for curing thick sections and high-energy electrons useful where the section is under a few millimeters thick.

To provide a cured silicone rubber from an RTV silicone gum several procedures are useful. With an RTV gum of high content of hydrolyzable oxygen linkages or hydroxyl (e.g., terminal silanol) groups, the gum is mixed with a cross-linking agent, usually ethyl silicate, and also usually a filler. A suitable catalyst, such as dibutyltin dilaurate, then is blended therein just before use. Polymerization and cross-linking begins immediately, with elimination of ethyl alcohol. The cure generally is such that the product is tack-free in from 1 to 16 hours and substantially fully cured in about 8 to 48 hours. Generally, if cured in a mold, the mold is opened and closed several times to permit trapped gas to escape. Catalysts for these RTV gums and the amounts used are well known with the employed catalyst frequently being a tin or organotin salt. The foregoing is illustrative of the two-package system for processing a type of RTV gum to a cured silicone rubber. There also is a one-package system containing an RTV gum which also is processable to a cured silicone rubber. In this one-package system, there is contained an RTV gum of an adequate content of hydrolyzable oxygen linkages or hydroxyl groups or other reactive sites, the cross-linking agent and the catalyst, and the whole, packaged to protect it from moisture. Contact with moisture in air brings about reactions which cure the RTV gums to the cured silicone rubber. Acetic acid or methyl ethyl ketoxine are typical by-products of various useful curing systems. Cure generally is relatively rapid at ambient condition with a tack-free state reached in about 15 to 30 minutes and a full cure reached in from about one day to three weeks. Some one-package systems are pourable and others are thixiotropic. As is well known, fillers and additives also may be used in the one-package system alike in the preparation of the heat-curable gum compositions, but such fillers and additives must be compatible with the curing agent and also must be dry.

In practice of the invention, several variations are possible. Thus, an unvulcanized silicone gum compound (i.e., containing cross-linking agent and catalyst with or without conventional additives) may be prepared and then (a) applied to, bonded to, and cured while overlaying the surface of the article to be protected from marine fouling with or without first priming the surface to facilitate adhesion thereto; (b) alternatively it may be applied to, bonded to, and cured while overlaying the surface of various component portions of the article and then these components subsequently assembled into the useful article; and (c) alternatively it may be cured into sheets, slabs, films, and the like and then these assembled to overlay and affixed to the surfaces to be protected from marine fouling, generally with adhesives or cements to bond them to the surface. Some types of the useful silicone gums upon curing are self-bonding to various substrate surfaces. For example, upon curing in contact therewith some RTV gums bond to clean unprimed aluminum with bonds of 200-p.s.i. shear strength or 20-lb./in. peel strength, and with copper, glass, acrylate resin, and the like there also are reported good bonds. However, with many surfaces, such as steel and iron, it is conventional to prime that surface to facilitate bonding thereto of the cured silicone rubber. Usually the priming is an applying of a thin coating up to a few mils thick of a solution of a silicate ester or curable silicone paste to the surface, followed by evaporation of the solvent therefrom. This then is followed by an application thereover of the unvulcanized silicone gum compound which is cured while in contact with such an applied primer coating.

To illustrate significant value of cured silicone rubber in preventing of marine fouling the following curable silicone gum compounds are prepared:

|  | Parts by weight | |
|---|---|---|
|  | Formulation A | Formulation B |
| Heat-curable general purpose silicone gum, essentially a linear polydimethylsiloxane of which about 0.3% of the methyl groups are replaced by vinyl groups, such as W-96 gum (Silicone Division—Union Carbide Corporation) | 100 | 100 |
| FEF carbon black (Philblack A) | 30 | 30 |
| Di-tertiarybutyl peroxide | 1 | 3 |

In preparing the above formulations, the silicone gum and carbon black are mixed thoroughly together on a two-roll mill and allowed to stand overnight This mixture then is remilled and the ditertiarybutyl peroxide added and blended therein near the end of the milling. Sheets, about 0.075-inch thick, are molded from each formulation with curing in a mold at 330° F. and 500 p.s.i. pressure for one hour, whereupon the mold is cooled to about 200° F. or lower before removing the sheets from the mold. A set of sheets from each formulation is molded with smooth surfaces by employing a polished mold cavity, while another set of each is molded with rough surfaces from employing a mold cavity having sand-blasted surfaces.

Duplicate sheet specimens of cured silicone rubber of each formulation then are exposed to an aqueous marine-fouling environment and periodically inspected thereafter for any evidence of marine fouling. The exposure is by immersing the specimen to a depth of 2 feet below low tide (5 feet at high tide- in Atlantic Ocean coastal water near (at) Daytona Beach, Fla., U.S.A. The ocean's coastal waters at this location are semi-tropical, and biological activity is high causing rapid attachment and build-up of hard-shelled marine growth on stationary objects. Previous evaluation of numerous anti-fouling paints and the like as well as concurrent evaluations of a number of other materials established this location to be a very useful test locale for evaluation of marine fouling. For example, a metal surface of iron or steel in the absence of any anti-fouling protection thereof evaluated at this location becomes heavily marine fouled within 8 weeks.

The exposed specimens periodically are evaluated for evidence of marine fouling thereof by fouling organisms of barnacles, mollusks, annelids, hydroids. and encrusting and filementous bryozoa, and rated as to the extent of fouling by these organisms. The rating scale used for general performance and fouling description ranged from 10 to 0, with 0 indicating fouling over the completed surface, 10 indicating no fouling apparent, and numbers intermediate 0 and 10 indicating relative and proportional ratings of observed foulings intermediate no fouling and complete fouling. Where size of the fouling organisms is reported, generally it is given numerically in inches. Where a legend is used for describing size, S designates seed size and CR designates creeping. Where the legend TR is employed in the fouling description, TR designates a trace of fouling or less than a perfect condition of a no fouling rating of 10 yet not a rating a low as 9 on the fouling scale. Description of these principal fouling organisms for which evaluation is made can be found in the aforementioned monograph, "Marine Fouling and Its Prevention," and in particular chapter 9 thereof, entitled "The Principal Fouling Organisms," commencing on page 118, with especial reference to sections on barnacles, commencing on page 121; mollusks, commencing on page 131; annelids, commencing on page 139; and bryozoa, commencing on page 141. The following Table I presents results of sheet panel specimens of cured silicone rubbers, of cured Formulations A and B, after exposure of these specimens in Atlantic Ocean coastal water for the noted time intervals.

TABLE I

[Fouling description: Rating—10 to 0; 0=complete fouling]

| Cured silicone rubber sheet | General performance | Barnacles | | Annelids | | Hydroids | | Bryozoa, encrusting | | Scum and silt |
|---|---|---|---|---|---|---|---|---|---|---|
| | | Rating | Size | Rating | Size | Rating | Size | Rating | Size | |
| Formula A: | | | | | | | | | | |
| Smooth surface: | | | | | | | | | | |
| 2 mos. exposure | 8 | 9 | S | 9 | ⅛-¼ | 9 | | 7 | ⅛-½ | 10 |
| 12 mos. exposure | 8 | TR | S-¹⁄₁₆ | 8 | ¼ | | | | | 9 |
| 28 mos. exposure | 10 | 10 | | | | | | 10 | | |
| Rough surface: | | | | | | | | | | |
| 2 mos. exposure | 7 | 9 | S | 9 | ¼ | 9 | | 7 | ⅛-¼ | 10 |
| 12 mos. exposure | 7 | TR | S-¹⁄₁₆ | 8 | ¼ | | | 9 | | 9 |
| 28 mos. exposure | 10 | 10 | ¼ | | | | | | | |
| Formula B: | | | | | | | | | | |
| Smooth surface: | | | | | | | | | | |
| 2 mos. exposure | 6 | 9 | S-¹⁄₁₆ | 9 | ⅛-½ | 9 | CR | 6 | | 10 |
| 12 mos. exposure | 7 | TR | S-¹⁄₁₆ | 8 | ¼ | | | | | 9 |
| 28 mos. exposure | 10 | 10 | ¼ | | | | | 9 | | 10 |
| Rough surface: | | | | | | | | | | |
| 2 mos. exposure | 6 | 9 | S-⅛ | 9 | ⅛-½ | 9 | CR | 5 | | 10 |
| 12 mos. exposure | 7 | TR | S-¹⁄₁₆ | 8 | ¼ | | | | | 9 |
| 28 mos. exposure | 10 | 10 | S | | | | | | | 10 |

To illustrate several embodiments of the invention there are prepared articles, comprised of surfaces of various materials having cured silicone rubber overlying and adhered thereto, and these embodiments then are evaluated as to their resistance to marine fouling, as set forth in the specific illustrative examples which follow.

EXAMPLE 1

Sheets of ¹⁄₁₆-inch thick, unprimed, but clean, aluminum are overlaid and bonded to cured silicone rubber as follows: A milled sheet of curable silicone gum compound is placed on top of the aluminum sheet and, while so positioned, this assembly is placed in a mold and cured at about 330° F. at 500 p.s.i. pressure for about one hour. After cooling of the mold, the resulting product of a cured silicone ruber (about ¼-in. thick) overlying a surface of the aluminum sheet is removed. It then may be used to fabricate that portion of an article, such as a buoy or the like, which in usage would be exposed to aqueous marine-fouling environments. However for test purposes, these aluminum sheet/cured silicone rubber specimens, while unassembled as an article, are exposed to the aforedescribed aqueous marine-fouling environment of Altantic Ocean coastal water and periodically inspected thereafter for marine fouling. In this manner embodiments of aluminum sheet/ cured silicone rubbers of each of the aforedescribed Formulations A and B are prepared and evaluated. The following Table II presents the results of these evaluations.

As a comparison there also are prepared control specimens of ¹⁄₁₆-inch thick unprimed aluminum sheet overlaid with a cured nitrile ruber composition. Curable nitrile rubber formulations are prepared by conventional procedures and means of 100 parts by weight of Hycar 1042 nitrile rubber, 40 parts of semi-reinforcing furnace carbon black, and cured with either 1 or 3 parts of di-tertiary butyl peroxide, and 2.5 or 7.5 parts of dicumyl peroxide (40 percent). Press curing conditions used are 330° F., 500 p.s.i., for one-half hour, and otherwise these control specimens are assembled, cured, and evaluated alike the specimens of aluminum sheet overlaid with cured silicone rubber. The following Table II also presents the results of the evaluation of the aluminum sheet specimens overlaid with cured nitrile rubber.

TABLE II

[Fouling description: Rating—10 to 0; 0=complete fouling]

| | General performance | Barnacles Rating | Barnacles Size | Mollusks Rating | Mollusks Size | Annelids Rating | Annelids Size | Hydroids Rating | Hydroids Size | Bryozoa, encrusting Rating | Bryozoa, encrusting Size | Scum and silt |
|---|---|---|---|---|---|---|---|---|---|---|---|---|
| Cured silicone rubber overlying unprimed Al sheet: | | | | | | | | | | | | |
| Formula A, exposure: | | | | | | | | | | | | |
| 2 months | 7 | 9 | S | | | 8 | ¼–½ | 8 | CR | 7 | ¼ | 10 |
| 12 months | 7 | 9 | 1/16–¼ | | | 8 | ¼–2½ | | | 7 | | |
| 28 months | 9 | 10 | | 9 | 2 | 9 | 1 | | | | | 10 |
| Formula B, exposure: | | | | | | | | | | | | |
| 2 months | 7 | 8 | S | | | 8 | ¼–½ | 7 | CR | 8 | ¼ | 10 |
| 12 months | 8 | | | TR | | 9 | ¼ | | | 9 | | 8 |
| 28 months | 10 | 10 | ¼ | | | | | | | | | 10 |
| Control—cured nitrile rubber overlying unprimed Al sheet: | | | | | | | | | | | | |
| Exposure: | | | | | | | | | | | | |
| 2 months | 6 | 9 | S | | | 8 | ⅛–½ | 8 | CR | 6 | | 10 |
| 12 months | 1 | 6 | S | | | 7 | ¼ | | | 3 | | 10 |
| 28 months | 1 | 4 | S | 10 | | 7 | ¼ | | | 5 | | 10 |

EXAMPLE 2

In a manner alike Example 1, an aluminum member useful for a pier construction is wrapped with an overlapping milled sheet of curable silicone gum compound (Formulation B) and the compound heat-cured in a press in situ with the aluminum support member. Later this aluminum member overlaid with cured silicone rubber is assembled into a portion of a pier construction exposed to Atlantic Ocean coastal water in a semi-tropical region of the United States. Inspection is made after one month and monthly thereafter of this installed, cured silicone rubber/aluminum member and of an adjacent thereto aluminum member not provided with any antifouling coating, paint, or the like. Little to no evidence of marine fouling is noted on the cured silicone rubber/aluminum member with the minor fouling observed being of about the same order of magnitude as noted in Table II for a corresponding embodiment of an aluminum sheet/cured silicone rubber (Formulation B) after 28 months' exposure. In comparison, the untreated and unprotected aluminum member was almost completely fouled by marine organisms within one month after its installation and exposure to Atlantic Ocean coastal water.

EXAMPLE 3

In a manner alike Example 2, there is utilized a steel member for pier construction, except that the same is primed by spraying with a 30 to 40 percent solution of RTV silicone gum compound in aliphatic solvent, such as mineral spirits, and the solvent permitted to evaporate therefrom to leave about a 2 to 3 mil thick dry coating of the curable silicone gum compound thereon. Thereafter the primed steel member is wrapped with milled sheet of the curable general purpose silicone gum compound which then is heat-cured in a press in situ with its encased steel member. Alike Example 2, the resulting steel member encased in cured silicone rubber then is assembled as a a portion of a pier structure subject to exposure of an aqueous marine-fouling environment and found to be significantly resistant to marine fouling after an extended period of such exposure in comparison to a like steel member, untreated and not protected by an antifouling material thereon, subjected to the same period of like exposure.

EXAMPLE 4

In this example a small portion of the surface of the steel hull of an ocean-going vessel, while in dry dock, is overlaid with a cured silicone rubber. The portion to be overlaid is first wire-brushed clean to a bare steel metal surface. The bare metal then primed by brushing a thin coating thereon of a solvent-diluted (about 30 to 40 percent addition of mineral spirits) commercially available general purpose RTV silicone rubber compound, which is available in the form of a thixotropic, spreadable paste exhibiting easy flow under pressure but almost zero flow under static conditions, and then permitting the mineral spirits to evaporate from the applied coating. Thereupon 0.5 percent by weight of dibutyl tin dilaurate is blended with commercially available general purpose RTV compound. The resulting curable silicone compound quickly then is applied by a squeegee-type applicator as an about 1/16-inch thick coating over the primed surface and permitted to cure under ambient temperatures and relative humidities before the vessel is launched and placed in service. Other portions of the surface of the same steel hull also were wire-brushed clean and then coatings of various commercially available antifouling paint compositions, containing toxic materials, applied to the cleaned surfaces. Upon inspection of the hull of this vessel after an extended period of service of over 12 months wherein the vessel had traversed the North American and South American oceans and visited numerous ports, it is observable that the exposed surface of the cured silicone rubber overlying the steel surface of the vessel's hull is significantly free from fouling organisms, while at this time some marine fouling is observable on the antifouling paint surfaces.

EXAMPLE 5

Sheets, about 0.075-inch thick, of cured silicone rubber are prepared by press curing the aforedescribed Formulation B in a mold at 333° F. for one hour. These sheets then are cut into small pieces, admixed with solid carbon dioxide (Dry Ice), and comminuted at Dry Ice temperature into less than 1/32-inch maximum size particles of cured silicon rubber.

Fifty parts by weight of the 1/32-inch maximum size particles of cured silicone rubber are blended with 50 parts by weight of a commercially available general purpose RTV silicone rubber compound, which is available in the form of a thixotropic paste, and additional mineral spirits also blended therewith until a trowelable paste is obtained. This paste then is troweled as an about a 3/32-inch thick coating onto the metal undersurface of a buoy, oversprayed with a mineral spirits vehicle containing dibutyl tin dilaurate as a curing catalyst, and then permitted to cure under ambient temperatures and relative humidities before the buoy is placed in service.

After the buoy has been in service in Atlantic Ocean waters for several months, it is inspected for evidence of marine fouling on the cured silicone rubber overlying and protecting the buoy's undersurface. Little to no evidence of marine fouling is apparent.

EXAMPLE 6

Example 5 is repeated in substance except that the consistency of the trowelable paste is reduced to a spraying consistency by blending therewith additional mineral spirits and with a coating of less than 1/16-inch thick of this sprayable blend being sprayed onto the metal undersurface of a buoy and permitted to stand for several hours before overspraying with a mineral spirits vehicle containing dibutyl tin dilaurate. After an ambient-temperature and relative humidity cure, this buoy also is placed in service and also after several months of service found to be substantially free of marine fouling on the cured silicone rubber overlying and protecting the buoy's undersurface.

Although the foregoing specific examples present detailed illustrations of practice of the invention, it will be recognized that numerous variants thereof also fall within the true scope of the invention. For example, it is contemplated and also should be apparent as within the scope of the teachings herein, in lieu of a catalyzed heat-cure of a curable silicone gum or a moisture-cure of a curable RTV silicone gum to provide the cured silicone rubber, that in some instances and applications it may be desirable to employ gamma radiation or high-energy electron curing to provide the cured silicone rubber overlaying the surface to be protected from marine fouling; also while only a few of the numerous curable silicone gums and their curing systems have been illustrated, others are known and also will be useful upon curing to a cured silicone rubber in providing antifouling protection. Likewise, although surfaces of only a few materials and of only a few articles whose utility involves exposure to aqueous marine-fouling environments have been illustrated by the specific examples, it is contemplated that the surface of any material conventionally employed in those articles can be suitably protected from marine fouling with the only limitation as to particular surfaces and of particular articles being that of the skill of the art as to suitable application techniques and available adhesives for overlying and bonding the cured silicone rubber to the surface.

We claim:

1. In combination with a ship's hull having an outer surface normally immersed in sea water, an antifouling coating on said surface comprising a cured silicone rubber overlying and covering said surface.

2. The combination of claim 1 in which the cured silicone rubber is a heat-cured peroxide-catalyzed polydimethylsiloxane polymer of a weight-average molecular-weight of at least about 500,000.

3. The combination of claim 1 in which the cured silicone rubber is a cured room temperature vulcanizable silicone gum.

4. The combination of claim 1 in which said surface is metal.

5. The combination of claim 4 in which the surface is a steel surface.

6. The combination of claim 4 in which the coating of the cured silicone rubber overlies and is bonded by a silicone gum primer to the surface.

References Cited

UNITED STATES PATENTS

| | | | |
|---|---|---|---|
| 2,986,474 | 5/1961 | Robbart | 117—132 BS X |
| 3,024,131 | 3/1962 | Hutchinson | 117—161 ZA X |
| 3,477,973 | 11/1969 | Lengnick et al. | 117—161 ZA X |
| 3,240,731 | 3/1966 | Nitzsche et al. | 117—161 ZA X |
| 3,455,762 | 7/1969 | Harper | 161—207 X |
| 2,902,389 | 9/1959 | Keil | 117—132 BS X |
| 2,601,337 | 6/1952 | Smith-Johannsen | 161—206 X |
| 3,243,867 | 4/1966 | Bernstein | 117—66 X |
| 3,426,473 | 2/1969 | Cardarelli et al. | 117—77 X |
| 3,619,256 | 11/1971 | Pepe et al. | 117—132 BS X |

RALPH HUSACK, Primary Examiner

U.S. Cl. X.R.

117—72, 94, 132 BS, 161 ZA; 156—329; 161—206, 207